(12) United States Patent
Roberts et al.

(10) Patent No.: US 9,113,297 B2
(45) Date of Patent: Aug. 18, 2015

(54) LOCATION-BASED APPLICATION MANAGEMENT METHODS AND SYSTEMS

(75) Inventors: Brian F. Roberts, Dallas, TX (US); Donald H. Relyea, Dallas, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 20 days.

(21) Appl. No.: 13/484,799

(22) Filed: May 31, 2012

(65) Prior Publication Data

US 2013/0324097 A1 Dec. 5, 2013

(51) Int. Cl.
| | |
|---|---|
| *H04W 24/00* | (2009.01) |
| *H04W 4/02* | (2009.01) |
| *H04W 4/00* | (2009.01) |
| *H04L 29/08* | (2006.01) |

(52) U.S. Cl.
CPC ............... *H04W 4/021* (2013.01); *H04L 67/34* (2013.01); *H04W 4/001* (2013.01)

(58) Field of Classification Search
CPC ....................................................... H04L 67/18
USPC ................. 455/41.2, 414.1, 456.1, 418, 419; 709/203; 717/120; 719/328
See application file for complete search history.

(56) References Cited

U.S. PATENT DOCUMENTS

| | | | |
|---|---|---|---|
| 2004/0137886 A1* | 7/2004 | Ross et al. ................. | 455/414.1 |
| 2009/0203364 A1* | 8/2009 | Cedo Perpinya et al. .. | 455/414.1 |
| 2010/0062758 A1* | 3/2010 | Proctor et al. ............. | 455/426.1 |
| 2010/0151821 A1* | 6/2010 | Sweeney et al. ............ | 455/410 |
| 2011/0029370 A1* | 2/2011 | Roeding et al. ............ | 705/14.38 |
| 2012/0059741 A1* | 3/2012 | Khan et al. .................. | 705/27.1 |

* cited by examiner

*Primary Examiner* — Christopher M Brandt
*Assistant Examiner* — Joseph Dean, Jr.

(57) ABSTRACT

An exemplary method includes a location-based application management system 1) determining that a mobile device associated with a user is located within a geographic vicinity associated with an entity, 2) automatically identifying, in response to the determining, an executable application associated with the entity, and 3) facilitating execution by the mobile device of the identified executable application while the mobile device is located within the geographic vicinity associated with the entity. Corresponding methods and systems are also disclosed.

20 Claims, 15 Drawing Sheets

LOCATION-BASED APPLICATION MANAGEMENT METHODS AND SYSTEMS

BACKGROUND INFORMATION

The popularity of applications ("apps") for mobile devices (e.g., smartphones and tablet computers) has risen drastically in recent years. To illustrate, many entities with brick and mortar establishments (e.g., retail businesses, kiosks, movie theaters, airports, banks, etc.) have developed mobile device applications with which mobile device users may interact while within geographic vicinities associated with the respective entities (e.g., near and/or within the entities' respective establishments). In this manner, the mobile device users may have a more enjoyable, productive, and/or fulfilling experience while visiting or otherwise interacting with such establishments.

Unfortunately, however, a user typically has to manually locate a mobile device application provided by a particular entity within an online application store and then download and install the application before he or she may use the mobile device application while within a geographic vicinity associated with the entity. With the plethora of available mobile device applications, this may be difficult, time consuming, and/or cumbersome for the user to perform. Even if the user already has the application installed on his or her mobile device, he or she has to manually launch (i.e., initiate) the application in order to use the application while within the geographic vicinity associated with the entity. This, too, can be difficult, time consuming, and/or cumbersome for many users. As a result, many mobile device users do not end up using entity-provided mobile device applications to their full extent or at all.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Location-based application management methods and systems are described herein. As will be described below, a location-based application management system may 1) determine that a mobile device associated with a user is located within a geographic vicinity associated with an entity, 2) automatically identify, in response to the determination, an executable application associated with the entity, and 3) facilitate execution by the mobile device of the identified executable application while the mobile device is located within the geographic vicinity associated with the entity.

As used herein, an "executable application" (or simply "application") may include any application that may be executed by a mobile device. For example, an executable application may include a stand-alone application, a web-based application, a mobile app, and/or any other type of application as may serve a particular implementation. In some examples, an application may be provided by (e.g., developed by and/or directly associated with) a particular entity. Alternatively, the application may be provided by a third-party not necessarily associated with the entity (e.g., a restaurant finder application, etc.).

The methods and systems described herein may allow a user to readily and easily interact with an application associated with (e.g., provided by) an entity while within a geographic vicinity associated with the entity. For example, in accordance with the methods and systems described herein, a user may walk into a store in which she has never been and be presented with an application provided by the store on her mobile device without having to manually download and/or launch the application. The user may then use the application to browse merchandise available for sale in the store, view coupons or other special offers, purchase items without having to stand in line, and/or otherwise interact with the store, thereby enhancing her shopping experience and allowing the store to more fully engage the user.

Figure 1:
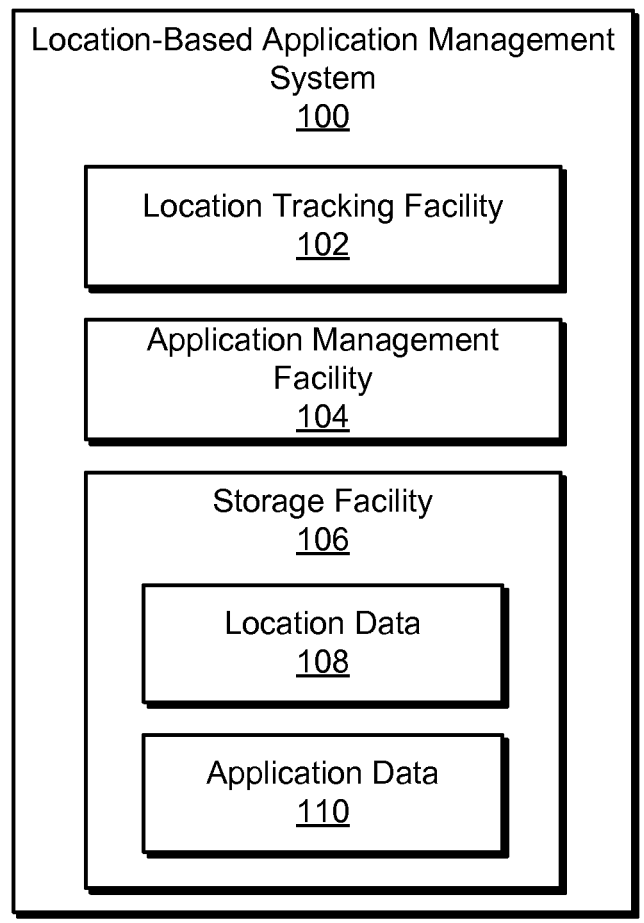
FIG. 1 illustrates an exemplary location-based application management system according to principles described herein.

FIG. 1 illustrates an exemplary location-based application management system 100 ("system 100"). As shown, system 100 may include, without limitation, a location tracking facility 102, an application management facility 104, and a storage facility 106 selectively and communicatively coupled to one another. It will be recognized that although facilities 102-106 are shown to be separate facilities in FIG. 1, any of facilities 102-106 may be combined into fewer facilities, such as into a single facility, or divided into more facilities as may serve a particular implementation.

Location tracking facility 102 may be configured to track (e.g., detect) a geographic location of a mobile device associated with a user. Location tracking facility 102 may be configured to detect an exact location (e.g., latitude and longitude coordinates) of a mobile device. Alternatively, location tracking facility 102 may be configured to detect an approximate location (e.g., by way of triangulation) of the mobile device.

The tracking of the geographic location of the mobile device may be performed in any suitable way and using any suitable technologies, including, without limitation, Global Positioning System ("GPS") technologies and terrestrial signaling triangulation technologies. In certain embodiments, location tracking facility 102 may track the geographic location of a mobile device relative to (e.g., within) a particular geographic space (e.g., within a site premises such as a shopping mall, office building, or other structure). One or more wireless signaling transmitters may be employed to boost reception of location tracking signals within a site premises.

In some examples, location tracking facility 102 may be configured to determine that a mobile device associated with a user is located within a geographic vicinity associated with an entity. This may be performed in any suitable manner. For example, location tracking facility 102 may detect a geographic location of the mobile device and determine that the detected geographic location is within the geographic vicinity associated with the entity.

Figure 2:
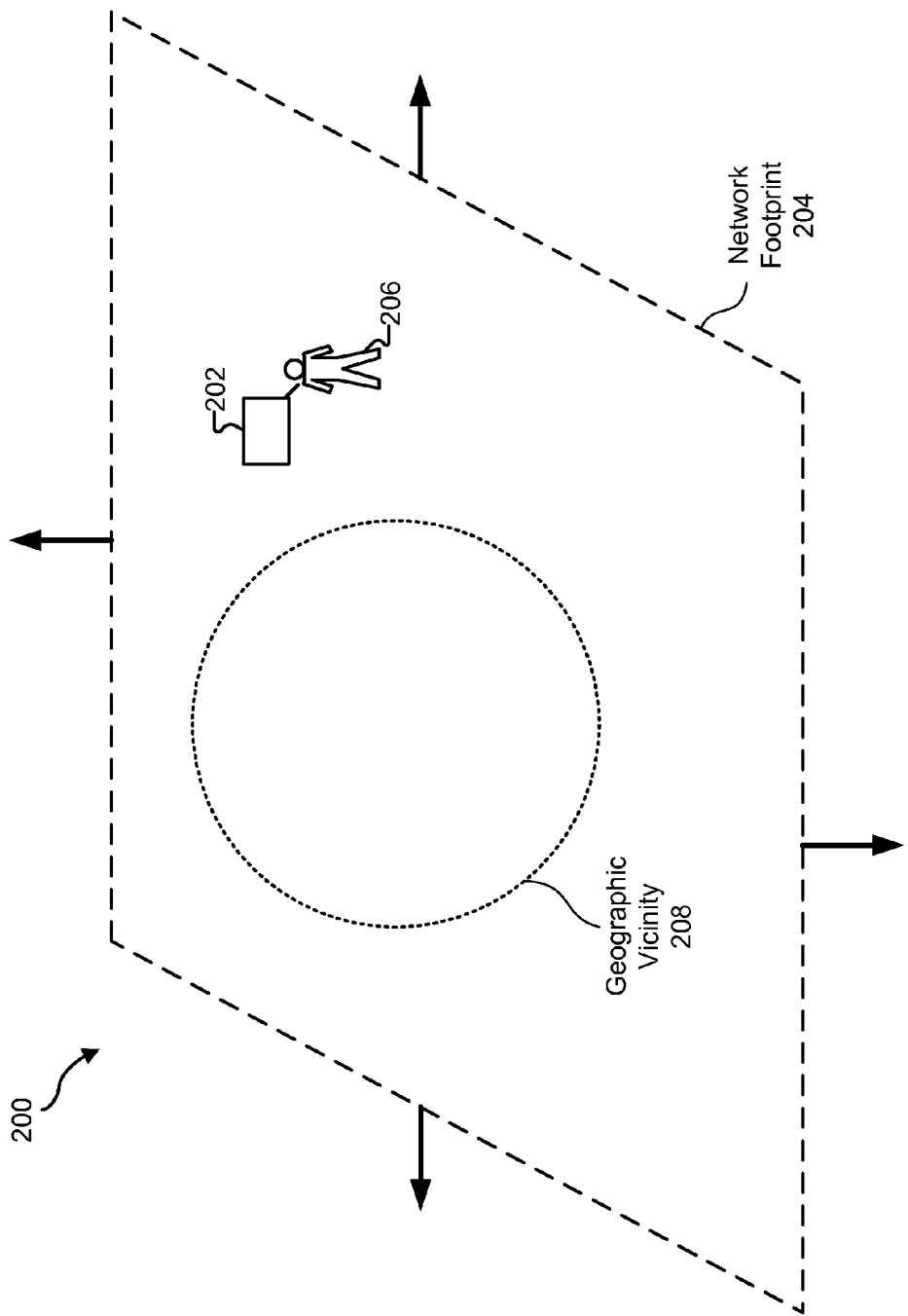
FIGS. 2-3 illustrate how a mobile device may enter into a geographic vicinity associated with an entity according to principles described herein.

To illustrate, FIG. 2 shows a configuration 200 wherein a mobile device 202 is physically located at a particular geographic location within an exemplary network footprint 204. Network footprint 204 refers to a collective geographic space within which mobile device 202 is able to receive and transmit network communication signals (e.g., signals to or from a satellite or a broadcast tower). As represented by arrows in FIG. 2, the reach of the network footprint 204 may extend beyond the illustrated portion of the network footprint 204. Additionally, while FIG. 2 illustrates a two-dimensional network footprint 204, it will be understood that the network footprint 204 may be three dimensional in certain implementations.

Mobile device 202 may include a mobile phone, a smartphone, a tablet computer, a laptop computer, and/or any other mobile computing device as may serve a particular implementation. As shown, mobile device 202 may be associated with (e.g., carried and/or used by) a user 206.

FIG. 2 also illustrates an exemplary geographic vicinity 208 that may be associated with a particular entity that has a physical presence within network footprint 204. As used herein, an "entity" refers to any business, individual, group, organization, governmental agency, and/or other entity that has a physical presence within network footprint 204. For example, an entity may have or be associated with a building, business, office, kiosk, movie theatre, airport, bank, stadium, and/or any other type of physical structure within network footprint 204. Additionally or alternatively, an entity may be associated with a particular geographic area (e.g., a park, body of water, neighborhood, city, etc.) within network footprint 204.

The boundaries of geographic vicinity 208 may be user-definable and may include any suitable area as may serve a particular application. For example, as shown in FIG. 2, geographic vicinity 208 may include a circle having a radius that is a predetermined distance from a structure (e.g., a building, kiosk, etc.) associated with the entity associated with geographic vicinity 208. Alternatively, geographic vicinity 208 may include a particular premises location (e.g., a shopping mall, restaurant, store, meeting place, building, park, body of water, neighborhood, city, etc.). Other boundaries for geographic vicinity 208 may be defined as may serve a particular application.

Figure 3:
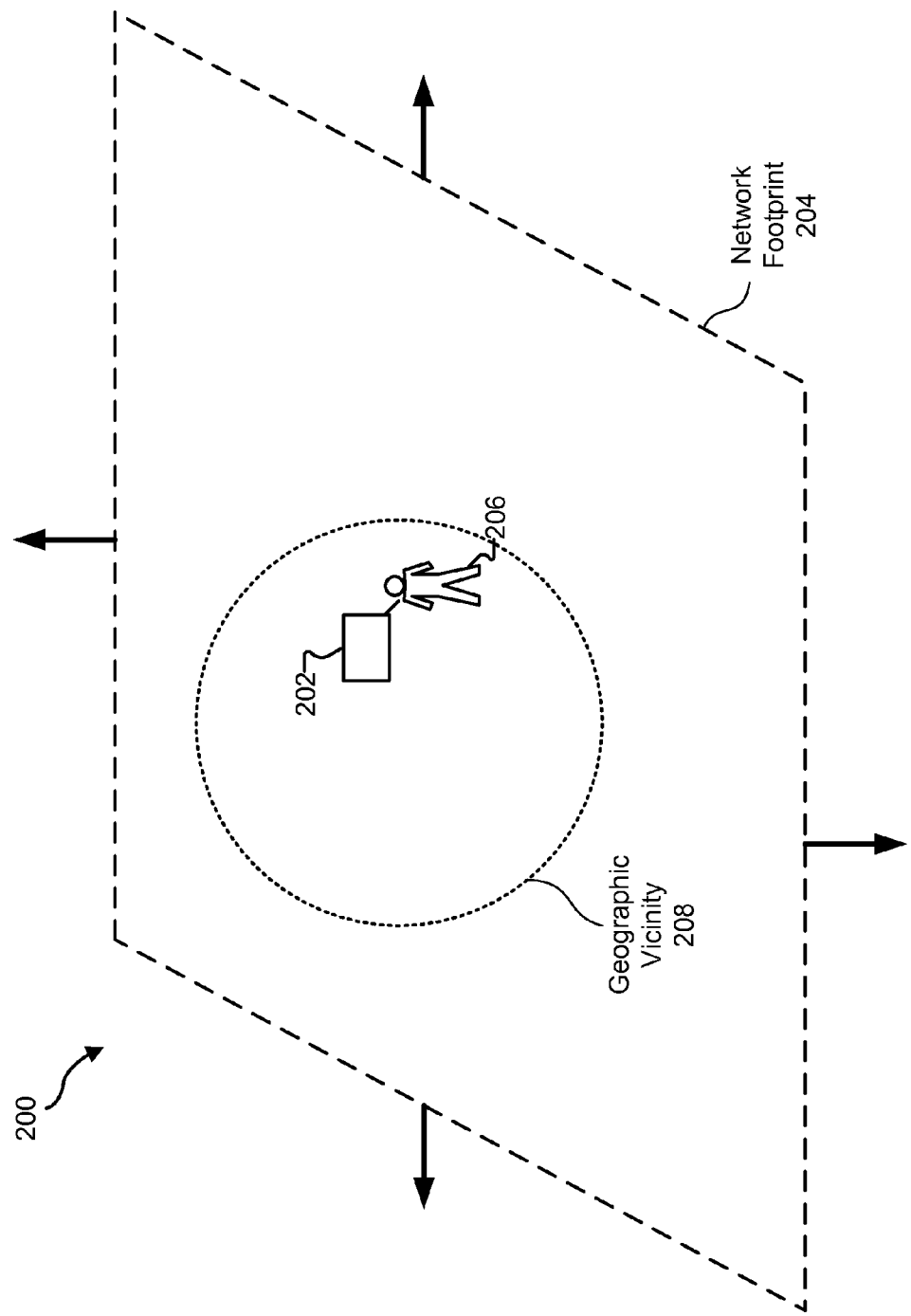

As shown, mobile device 202 and user 206 are initially located outside the boundaries of geographic vicinity 208. User 206 may then walk or otherwise enter into geographic vicinity, as illustrated in FIG. 3. In response, location tracking facility 102 may detect that the user has entered geographic vicinity 208 (e.g., by detecting a geographic location of mobile device 202 and determining that the detected geographic location is within geographic vicinity 208).

Returning to FIG. 1, application management facility 104 may be configured to perform one or more application management operations. For example, in response to location tracking facility 102 determining that a mobile device (e.g., mobile device 202) associated with a user (e.g., user 206) is located within a geographic vicinity (e.g., geographic vicinity 208) associated with an entity, application management facility 104 may be configured to automatically identify an executable application associated with the entity and facilitate execution by the mobile device of the identified executable application while the mobile device is located within the geographic vicinity associated with the entity.

Application management facility 104 may automatically identify an executable application associated with an entity in any suitable manner. For example, application management facility 104 may detect an identifier associated with the entity and use the detected identifier to identify the executable application. To illustrate, application management facility 104 may detect a name of the entity (e.g., by analyzing data that defines the geographic vicinity of the entity) and search for the name within a look-up table or the like that links various entities with their corresponding applications. If a matching name is located within the look-up table, application management facility 104 may identify a corresponding application within the look-up table as being the executable application for which application management facility 104 is to facilitate execution by the mobile device.

Once an executable application is identified, application management facility 104 may facilitate execution by the mobile device of the identified executable application while the mobile device is located within the geographic vicinity associated with the entity in any suitable manner. For example, application management facility 104 may facilitate execution by the mobile device of the identified executable application while the mobile device is located within the geographic vicinity associated with the entity by determining that the identified executable application already resides on the mobile device (e.g., by querying the mobile device for the executable application, analyzing data maintained by a service provider associated with the mobile device, and/or in any other suitable manner) and directing the mobile device to begin executing the identified executable application.

To illustrate, a user may download and install an application provided by a particular movie theatre (a "movie theatre application") onto a mobile device. The user may subsequently go to the movie theatre and bring with him the mobile device. Location tracking facility 102 may detect entry of the mobile device (and consequently, the user) into a geographic vicinity associated with the movie theatre (e.g., location tracking facility 102 may detect entry of the mobile device into a building and/or parking lot associated with the movie theatre). In response, application management facility 104 may determine that the movie theatre application has already been installed on the mobile device and direct the mobile device to begin executing the movie theatre application (e.g., by launching, switching to, or otherwise initiating the movie theatre application).

Figure 4:
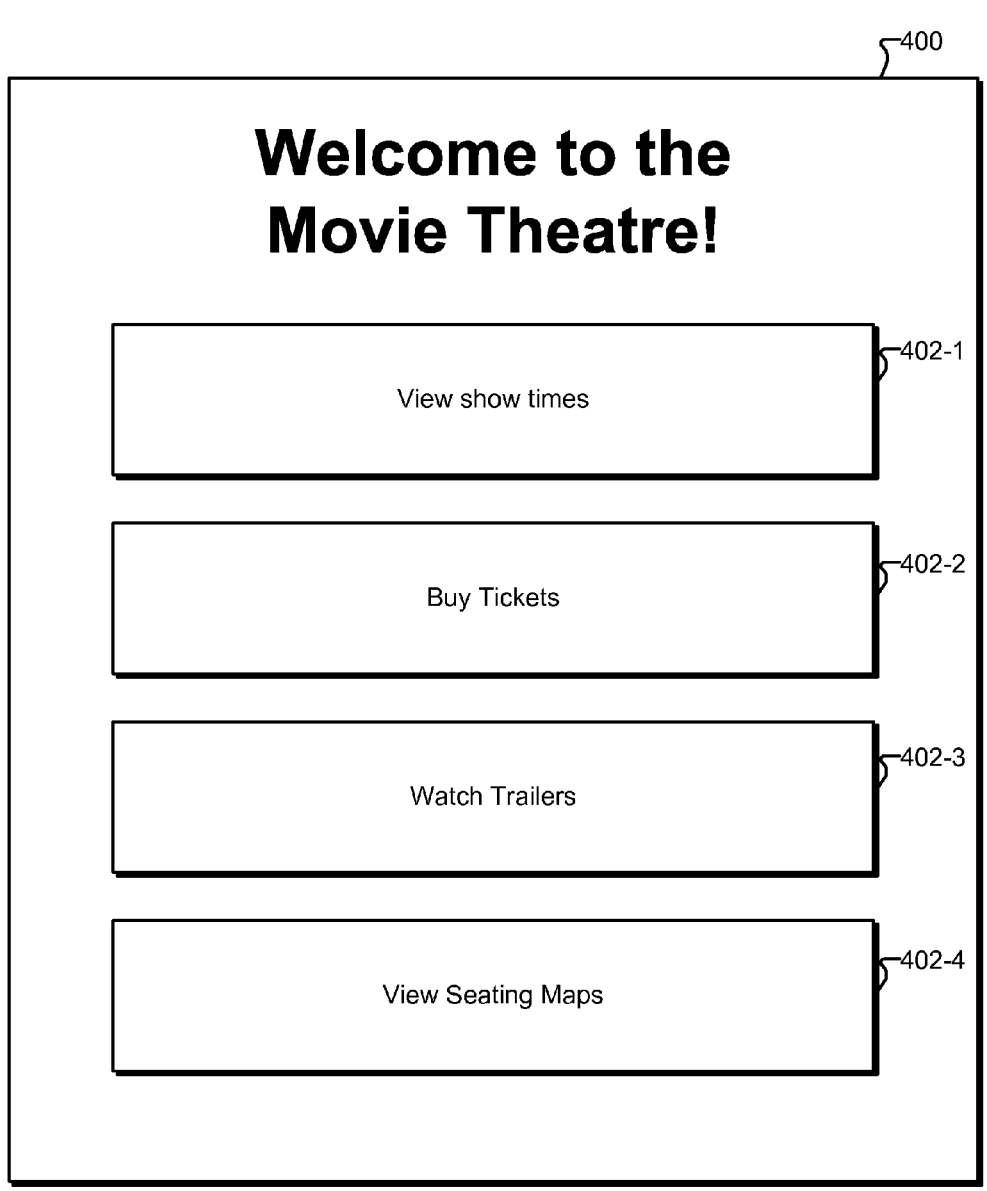
FIGS. 4-11 show exemplary interfaces that may be presented in accordance with the methods and systems described herein.

To illustrate, FIG. 4 shows an exemplary interface 400 that may be a part of the movie theatre application and that may be presented in response to application management facility 104 directing the mobile device to begin executing the movie theatre application. As shown, various selectable options 402 (e.g., selectable options 402-1 through 402-4) may be presented within interface 400. For example, the user may select option 402-1 to view show times at the movie theatre, option 402-2 to buy tickets to movies showing at the movie theatre, option 402-3 to watch trailers of movies showing at the movie theater, and/or option 402-4 to view seating maps associated with the movie theater.

As illustrated in this example, application management facility 104 may direct the mobile device to automatically begin executing an application associated with an entity upon entry of the mobile device into the geographic vicinity associated with the entity. To this end, application management facility 104 may be further configured to direct the mobile device to provide a notification to the user (e.g., in the form of an audible or visual alert) that the application is about to be executed and/or that the application is being executed by the mobile device.

Figure 5:
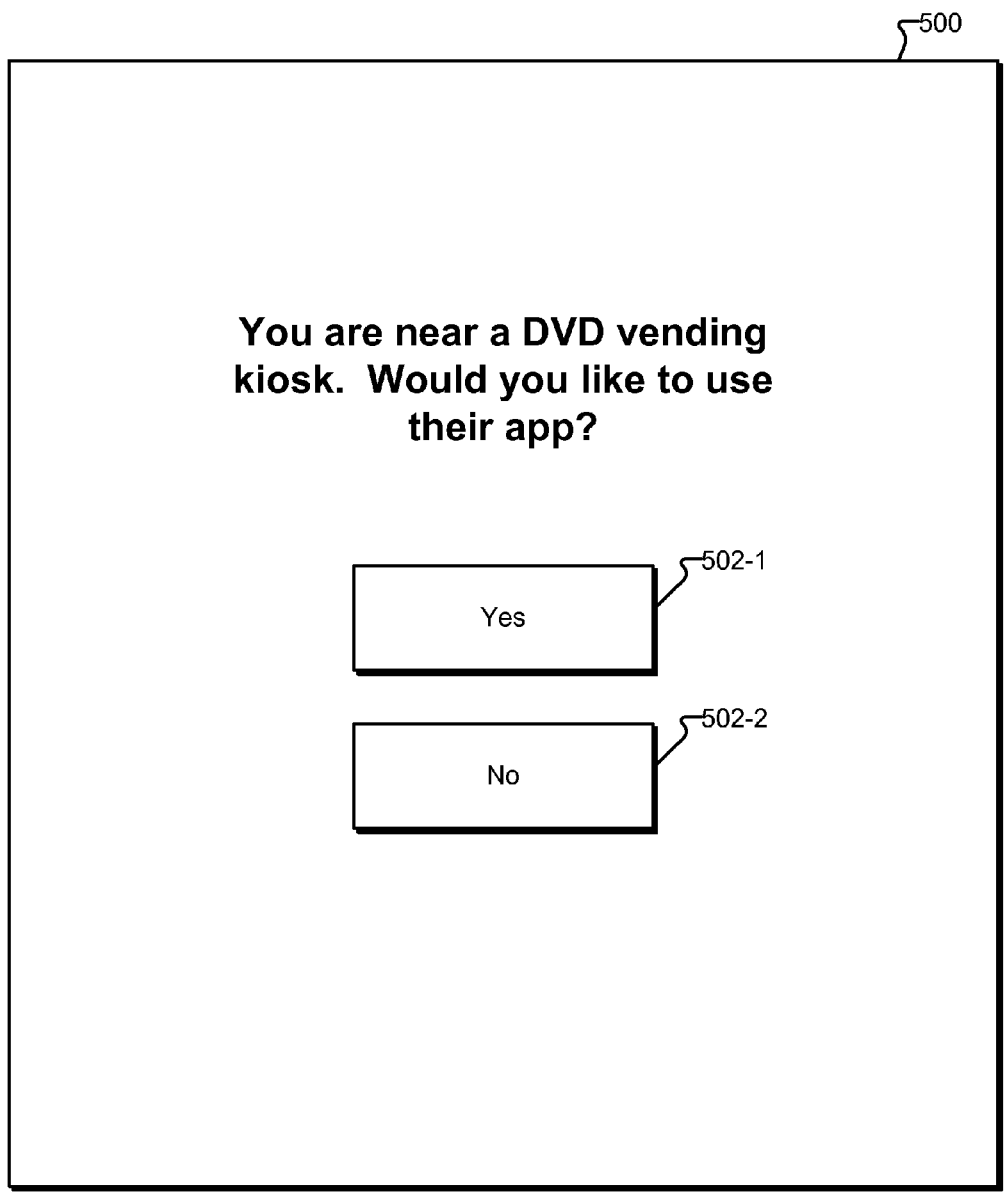

In some alternative examples, application management facility may direct the mobile device to present a selectable option to begin executing the identified executable application. In this manner, the user may determine whether he or she would like to use the application before it is launched or otherwise executed by the mobile device. To illustrate, FIG. 5 shows an exemplary interface 500 that may be presented by a mobile device to a user upon entry of the user and his associated mobile device into a geographic vicinity associated with a DVD vending kiosk (e.g., a Redbox kiosk). As shown in FIG. 5, interface 500 may present the user with a selectable option 502-1 to begin executing an application associated with the DVD vending kiosk (e.g., an application that allows a user to browse, select, and/or purchase a DVD from the DVD vending kiosk). An additional selectable option 502-2 may also be presented to the user that allows the user to prevent the mobile device from executing the application associated with the DVD vending kiosk.

In some examples, application management facility 104 may determine that the identified executable application does not already reside on the mobile device. For example, application management facility 104 may query the mobile device for the identified executable application and determine that it has not been installed on the mobile device. Additionally or alternatively, application management facility 104 may analyze a list of installed applications on the mobile device that is maintained by a service provider and/or any other entity to determine that the identified executable application has not been installed on the mobile device.

Figure 6:
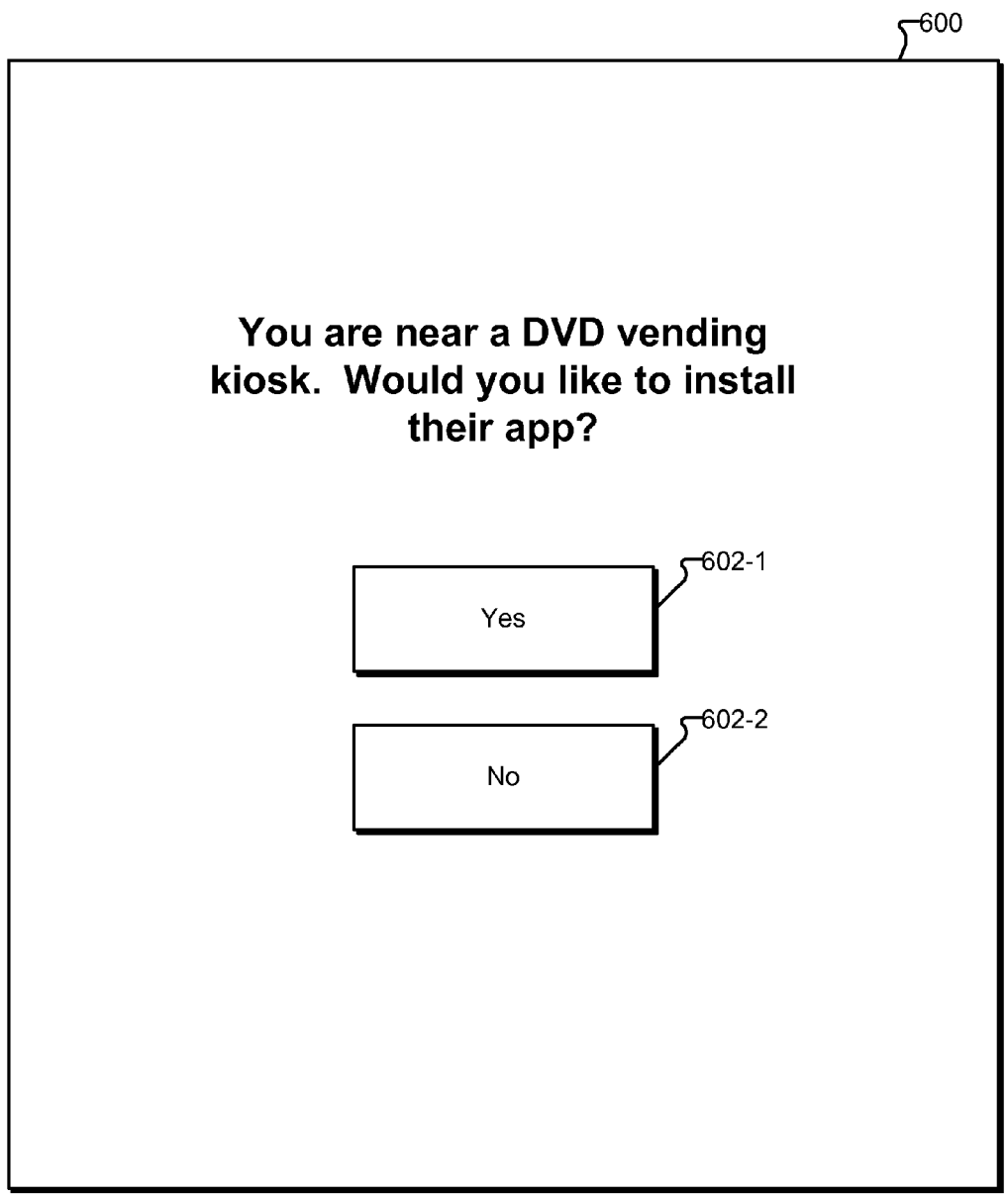

In these examples, application management facility 104 may facilitate execution by the mobile device of the identified executable application while the mobile device is located within the geographic vicinity associated with the entity by directing the mobile device to present a selectable option to download and install the identified executable application. To illustrate, FIG. 6 shows another exemplary interface 600 that may be presented by a mobile device to a user upon entry of the user and his associated mobile device into a geographic vicinity associated with a DVD vending kiosk. As shown, interface 600 may present the user with a selectable option 602-1 to download and install an application associated with the DVD vending kiosk. An additional selectable option 602-2 may also be presented to the user that allows the user to decline the invitation to download and install the application.

In some examples, application management facility 104 may detect a selection by the user of the option to download and install the identified executable application (i.e., option 602-1) and, in response, direct the mobile device to download, install, and begin executing the identified executable application upon completion of the download and installation. In this manner, the user may more readily interact with the application once it is installed. Additionally or alternatively, the user may be presented with an option to purchase access to the identified executable application.

In some examples, the geographic vicinities of various entities may overlap. For example, a shopping mall may house various businesses each providing a distinct application. The geographic vicinities associated with the businesses may overlap depending on the location of the various businesses within the shopping mall. Hence, to facilitate execution of one or more of these applications by a mobile device of a user located within the shopping mall, application management facility 104 may direct the mobile device to present the user with an option to select one or more of the applications for execution by the mobile device.

Figure 7:
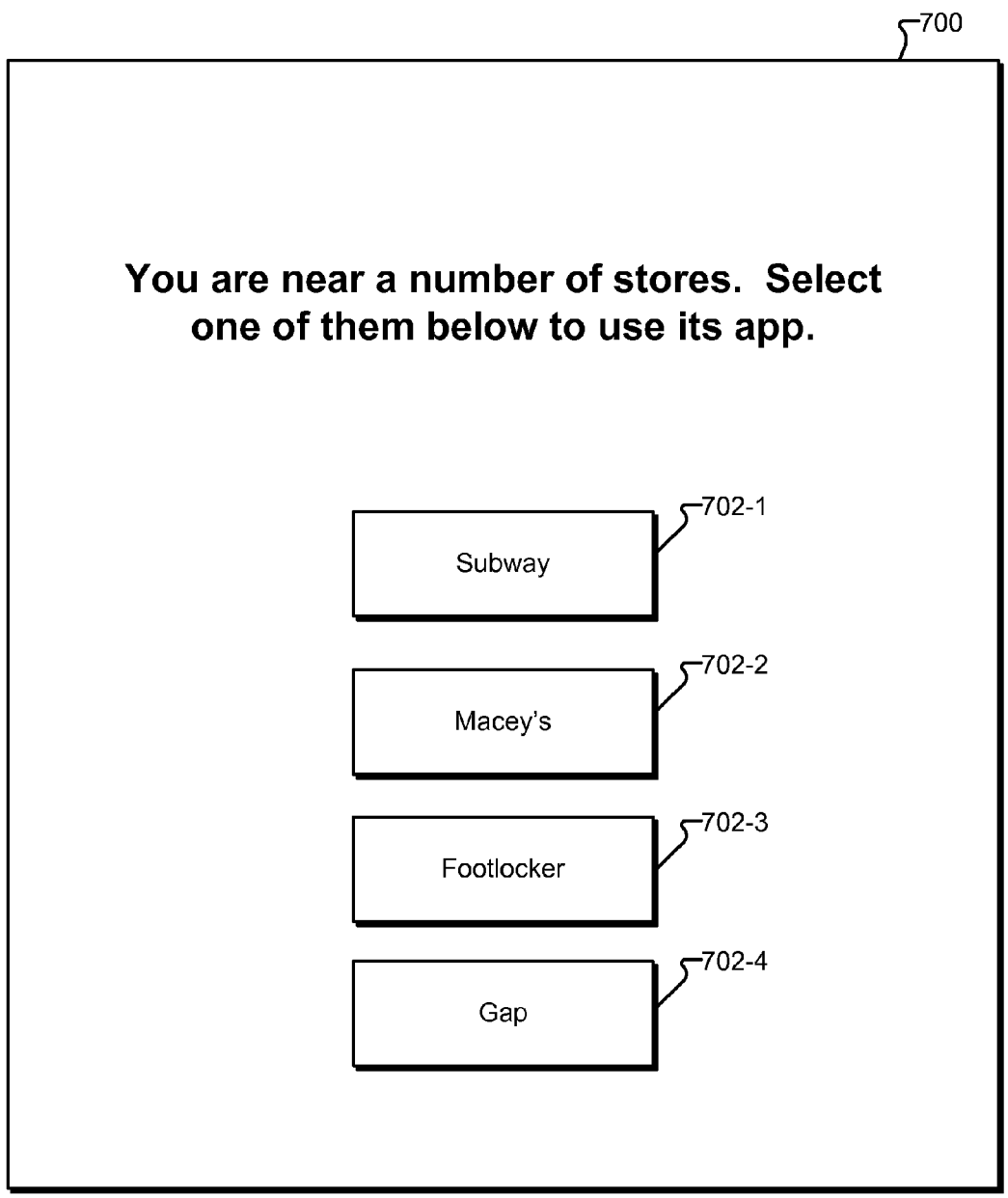

To illustrate, FIG. 7 shows an exemplary interface 700 that may be presented to a user located in a shopping mall. As shown, interface 700 lists various businesses (i.e., Subway, Macey's, Footlocker, and Gap) within the shopping mall that have mobile device applications that may be used by the user while at the shopping mall. To use one of the applications, the user may select an option from a plurality of options 702 (e.g., options 702-1 through 702-4) corresponding to the businesses. For example, to use an application associated with Subway, the user may select option 702-1.

As another example of overlapping geographic vicinities, application management facility 104 may facilitate execution of a collaborative application associated with multiple entities. The collaborative application may aggregate application programming interfaces ("APIs") from the multiple entities or otherwise facilitate interaction with each of the multiple entities.

Figure 8:
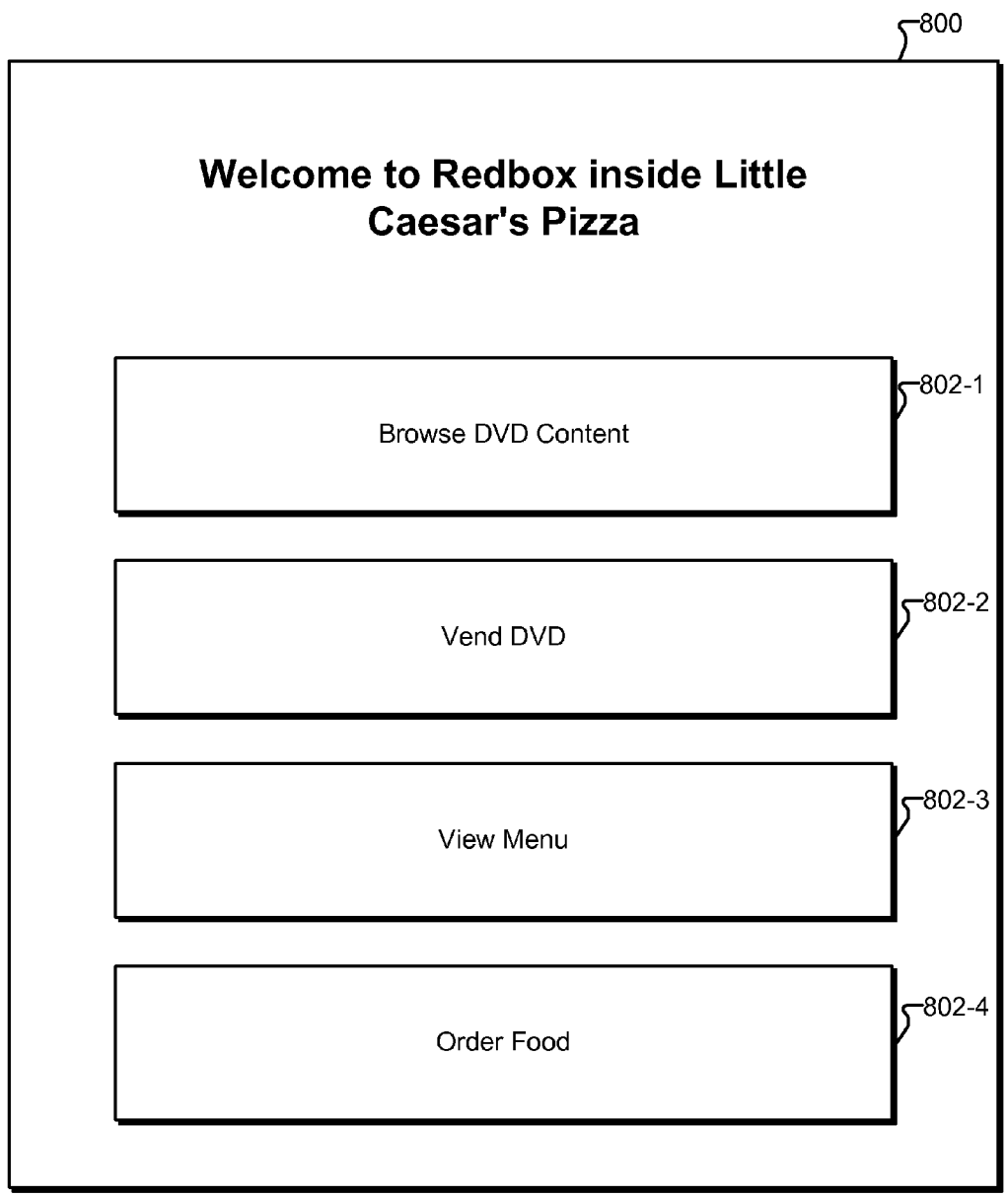

To illustrate, FIG. 8 shows an exemplary interface 800 that may be a part of a collaborative interface that a mobile device may execute while the mobile device and its user are located within a geographic vicinity associated with both a DVD vending kiosk and a restaurant (e.g., while the mobile device and its user are located within a restaurant named "Little Caesar's Pizza" that has a Redbox DVD vending kiosk located within its premises). As shown, interface 800 may include various options 802 (e.g., options 802-1 through 802-4) that may be selected by the user to access various options associated with both the DVD vending kiosk and the restaurant. For example, the user may select option 802-1 to browse DVD content available within the DVD vending kiosk, option 802-2 to vend a DVD from the DVD vending kiosk, option 802-3 to view the restaurant's menu, and/or option 802-4 to order food from the restaurant.

In some examples, application management facility 104 may facilitate execution by the mobile device of the identified executable application while the mobile device is located within the geographic vicinity associated with the entity by directing the mobile device to present an interface personalized to the user in accordance with a user profile associated with the user. The personalized interface may be configured to facilitate interaction by the user with the executable application.

Figure 9:
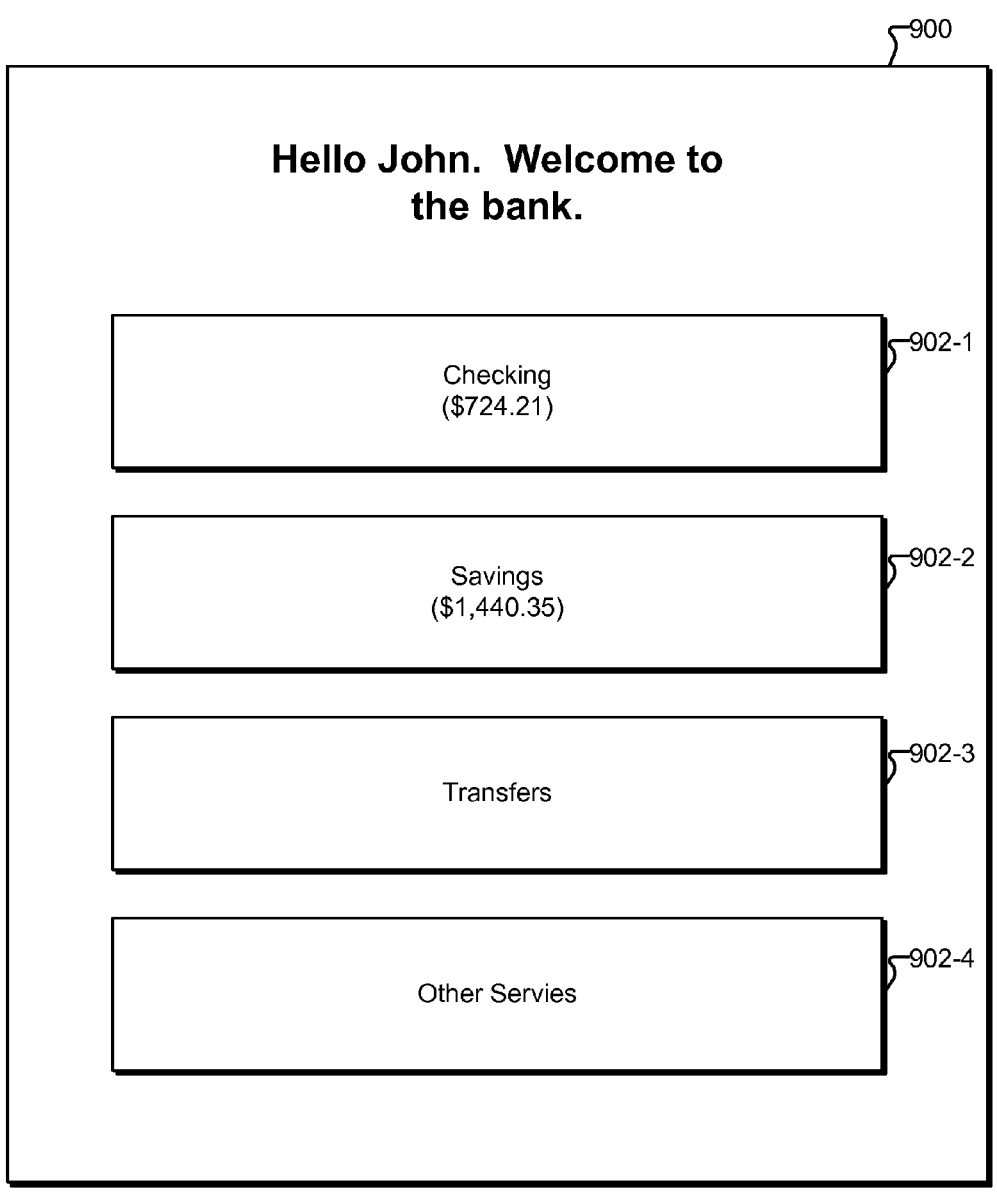

For example, a user named "John" may enter a geographic vicinity associated with a bank (e.g., a branch of the bank or an automated teller machine ("ATM") associated with the bank). In response, application management facility 104 may direct the user's mobile device to present an interface personalized to the user that allows the user to access various services provided by the bank. To illustrate, FIG. 9 shows an exemplary interface 900 that has been personalized to the user named "John." As shown, interface 900 may include various options 902 (e.g., options 902-1 through 902-4) that may be selected by the user to access various personalized services provided by the bank. For example, the user may select option 902-1 to access information regarding his checking account, option 902-2 to access information regarding his savings account, option 902-3 to perform one or more transfers, and/or option 902-4 to access one or more other services provided by the bank. In this manner, the user may perform one or more bank-related actions while waiting in line at the bank or at the ATM, sitting in his or her car outside the bank, and/or otherwise being within the geographic vicinity of the bank.

Figure 10:
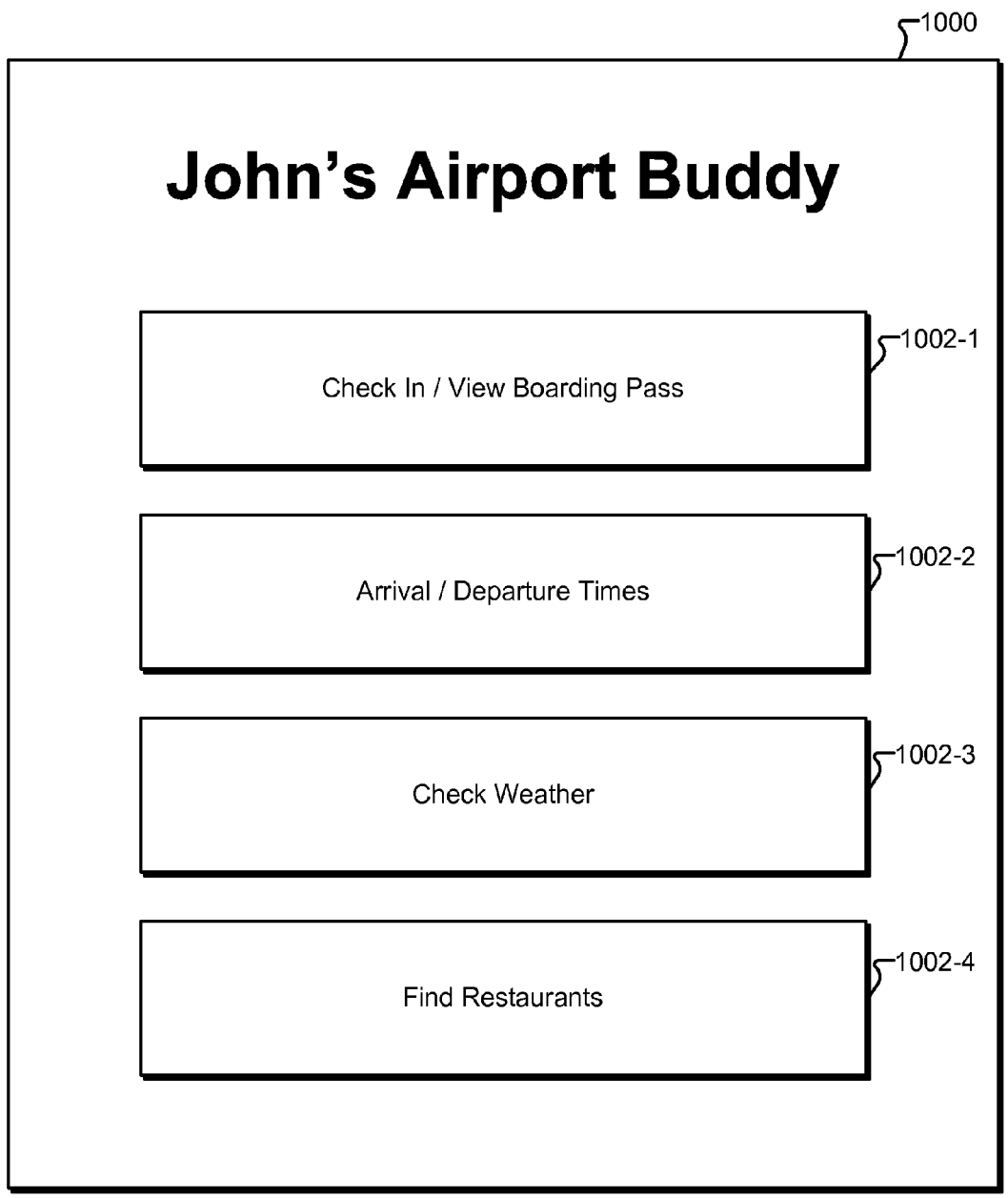

As another example, a user named "John" may enter an airport. In response, application management facility 104 may direct the user's mobile device to present an interface personalized to the user that allows the user to access various options associated with the airport. To illustrate, FIG. 10 shows an exemplary interface 1000 that has been personalized to the user named "John." As shown, interface 1000 may include various options 1002 (e.g., options 1002-1 through 1002-4) that may be selected by the user to access various options associated with the airport. For example, the user may select option 1002-1 to check in for a flight and/or view a boarding pass, option 1002-2 to view arrival and/or departure times, option 1002-3 to check the weather at the airport and/or at any other destination, and/or option 1002-4 to locate restaurants located within the airport.

To facilitate personalized interfaces such as those described in connection with FIGS. 9-10, application management facility 104 may authenticate the mobile device and/or user and provide a level of access by the user to the identified executable application based on the authentication. For example, application management facility 104 may verify one or more identities, credentials, and/or permissions of the mobile device and/or user (e.g., in order to prevent fraud). Application management facility 104 may be further configured to maintain or otherwise have access to data representative of a user profile of the user in order to provide a personalized interface for the user.

Figure 11:
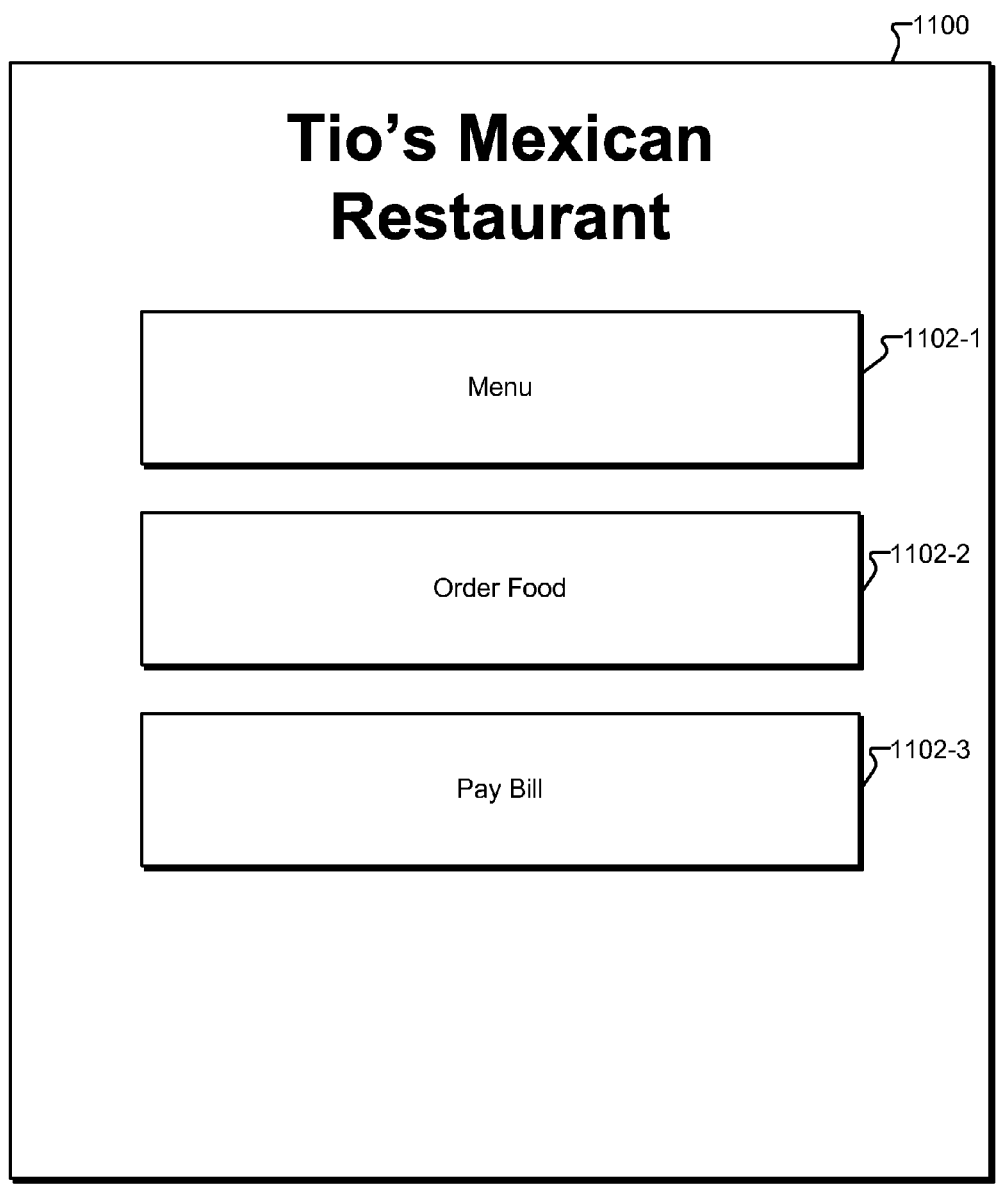

In some examples, application management facility 104 may be further configured to facilitate completion of one or more transactions between the entity and the user by way of the identified executable application while the mobile device is located within the geographic vicinity associated with the entity. To illustrate, FIG. 11 shows an interface 1100 that may be a part of an application associated with a restaurant and that may be presented to a user by way of a mobile device while the user is within the restaurant. As shown, interface 1100 may include various options 1102 (e.g., options 1102-1 through 1102-3) that may be selected by the user to access various options associated with the restaurant. For example, the user may select option 1102-1 to view the restaurant's menu, option 1102-2 to order food from the restaurant, and/or option 1102-3 to pay a bill for food ordered from the restaurant. Ordering food and paying bills by way of the application associated with interface 1100 are merely examples of the many different transactions that may be performed by way of an application executed by a mobile device while a user is located within a geographic vicinity associated with an entity.

As mentioned, application management facility 104 may facilitate execution by the mobile device of the identified executable application while the user is located within the geographic vicinity associated with the entity. In some examples, application management facility 104 may also facilitate continued use of the identified executable application even after the user has left the geographic vicinity associated with the entity. However, in some examples, it may be desirable to prevent the user from using the application after he or she has left the geographic vicinity associated with the entity. For example, a business may desire to prevent users from using an application that contains confidential information outside the confines of the business. To this end, application management facility 104 may determine that the mobile device is no longer located within the geographic vicinity associated with the business and, in response, prevent the application from being executed by the mobile device.

The applications and interfaces described herein are merely illustrative of the many different applications and interfaces that may be realized in accordance with the methods and systems described herein. Moreover, additional or alternative options and/or features may be included in any of the applications and/or interfaces described herein.

Returning to FIG. 1, storage facility 106 may be configured to maintain location data 108 generated and/or used by location tracking facility 102 and application data 110 generated and/or used by application management facility 104. Storage facility 106 may maintain additional or alternative data as may serve a particular implementation.

Figure 12:
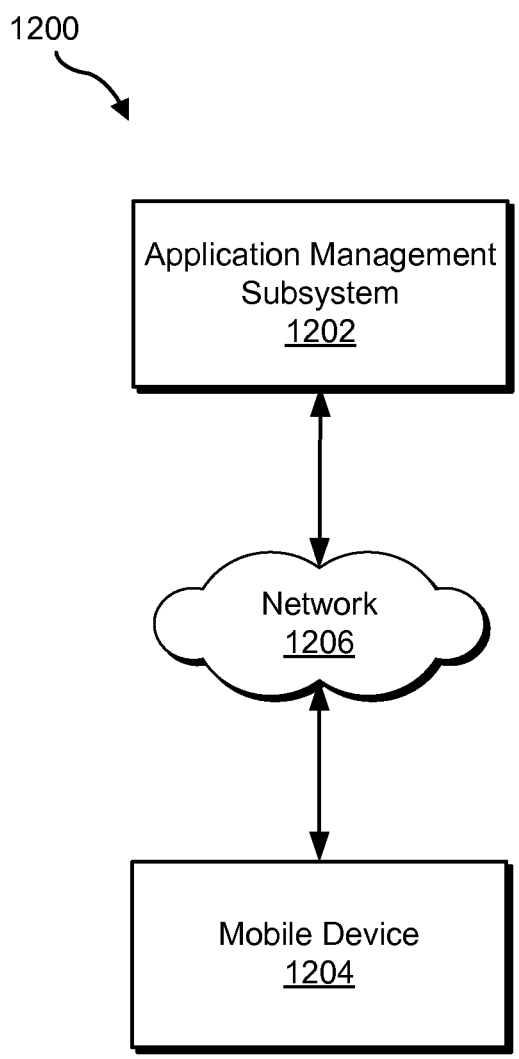
FIG. 12 illustrates an exemplary implementation of the system of FIG. 1 according to principles described herein.

FIG. 12 illustrates an exemplary implementation 1200 of system 100 in which an application management subsystem 1202 is communicatively coupled to a mobile device 1204. As will be described in more detail below, location tracking facility 102, application management facility 104, and storage facility 106 may each be implemented by application management subsystem 1202 and/or mobile device 1204.

Application management subsystem 1202 may be configured to maintain, provide, facilitate access to, and/or otherwise manage applications available for download and installation on mobile device 1204. For example, application management subsystem 1202 may be implemented by one or more components (e.g., servers, computing devices, etc.) associated with a service provider (e.g., an app store provider, an Internet service provider, a wireless carrier, etc.) that provides application services to one or more users (e.g., one or more subscribers).

Mobile device 1204 may be implemented by any suitable mobile computing device. For example, mobile device 1204 may be implemented by a mobile phone, a smartphone, a tablet computer, a laptop computer, and/or any other mobile computing device as may serve a particular implementation. In some examples, mobile device 1204 may be configured to facilitate access by a user to one or more applications managed by application management subsystem 1202. For example, mobile device 1204 may be configured to download and install one or more applications managed by application management subsystem 1202, execute one or more web-based applications managed by application management subsystem 1202, and/or otherwise execute one or more applications managed by application management subsystem 1202.

Application management subsystem 1202 and mobile device 1204 may communicate using any suitable communication technologies, devices, networks, media, and protocols supportive of remote data communications. For example, as shown in FIG. 12, application management subsystem 1202 may be configured to communicate with mobile device 1204 over a network 1206 (and communications links thereto). Network 1206 may include one or more networks or types of networks capable of carrying communications and/or data signals between application management subsystem 1202 and mobile device 1204. For example, network 1206 may include, but is not limited to, a mobile phone network (e.g., a cellular phone network), a mobile data network (e.g., a 3G network, a 4G network, etc.), a telecommunications network, a wide area network (e.g., the Internet, a WiMax network, a mobile data network, etc.), other network capable of transporting communications and data between application management subsystem 1202 and mobile device 1204, and/or any combination or sub-combination thereof.

Application management subsystem 1202 and mobile device 1204 may communicate over network 1206 using any suitable communication technologies, devices, media, and protocols supportive of remote data communications, including, but not limited to, data transmission media, communications devices, Transmission Control Protocol ("TCP"), Internet Protocol ("IP"), File Transfer Protocol ("FTP"), Telnet, Hypertext Transfer Protocol ("HTTP"), Real Time Protocol ("RTP"), User Datagram Protocol ("UDP"), Ethernet, and any other suitable communications technologies, devices, media, and protocols.

In certain embodiments, system 100 may be implemented entirely by application management subsystem 1202 or by mobile device 1204. In other embodiments, components of system 100 may be distributed across any combination of application management subsystem 1202 and mobile device 1204.

To illustrate, system 100 may be at least partially implemented by an operating system and/or a stand-alone application (e.g., a "vicinity" application) residing on mobile device 1204. The operating system and/or stand-alone application may be configured to allow a user to customize the various location-based application management features described herein (e.g., enable or disable one or more of the location-based application management features described herein, specify one or more categories or entities of interest, etc.).

As another example, system 100 may be at least partially implemented by application management subsystem 1202. To illustrate, an entity may participate in a location-based application distribution service provided by application management subsystem 1202 (which, in this case, may be associated with an application distributor (e.g., Apple, Google, a wireless carrier, etc.). In accordance with the location-based application distribution service, the entity may pay the application distributor to define a geographic vicinity associated with the entity and facilitate execution by mobile devices of an application associated with the entity while the mobile devices are located within the geographic vicinity.

Figure 13:
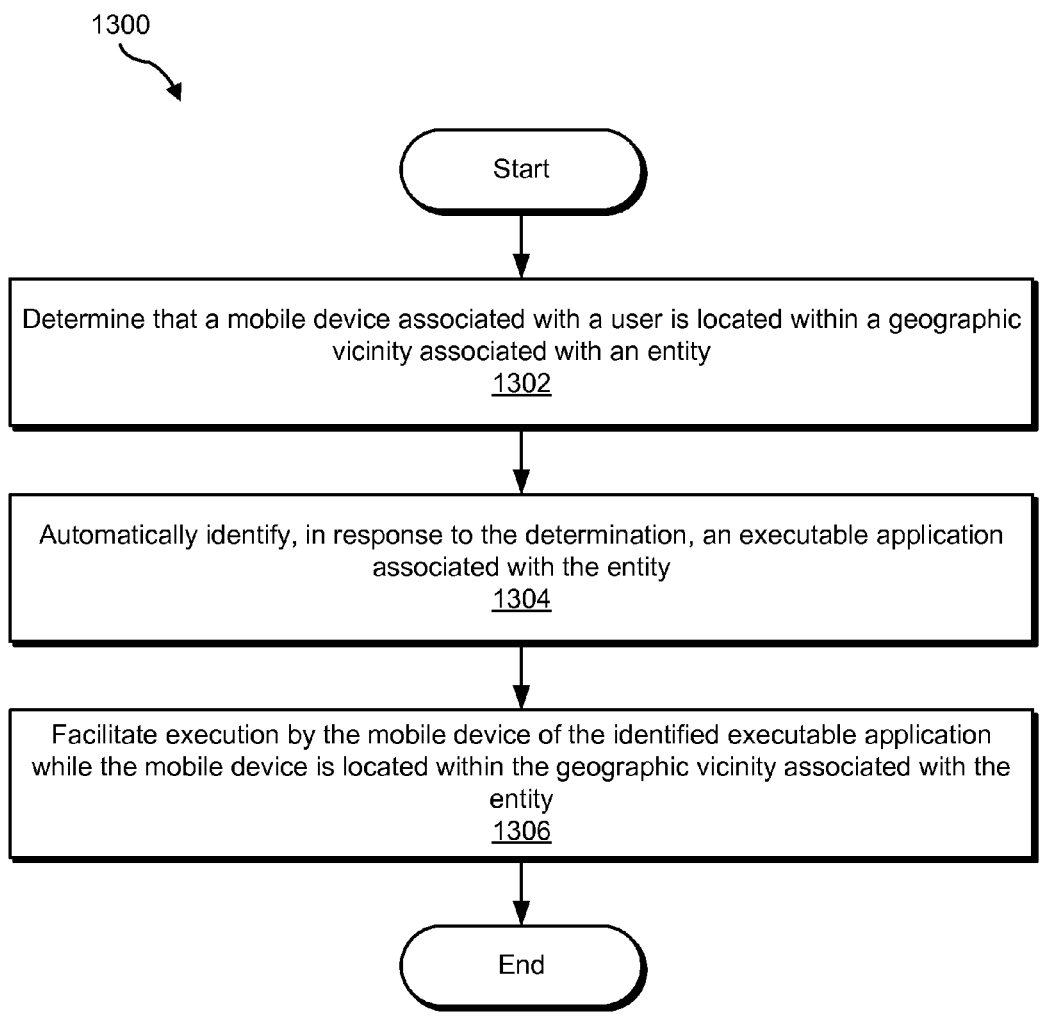
FIGS. 13-14 illustrate exemplary location-based application management methods according to principles described herein.

FIG. 13 illustrates an exemplary location-based application management method 1300. While FIG. 13 illustrates exemplary steps according to one embodiment, other embodiments may omit, add to, reorder, and/or modify any of the steps shown in FIG. 13. One or more of the steps shown in FIG. 13 may be performed by location-based application management system 100 and/or any implementation thereof.

In step 1302, a location-based application management system determines that a mobile device associated with a user is located within a geographic vicinity associated with an entity. Step 1302 may be performed in any of the ways described herein.

In step 1304, the location-based application management system automatically identifies, in response to the determination, an executable application associated with the entity. Step 1304 may be performed in any of the ways described herein.

In step 1306, the location-based application management system facilitates execution by the mobile device of the identified executable application while the mobile device is located within the geographic vicinity associated with the entity. Step 1306 may be performed in any of the ways described herein.

Figure 14:
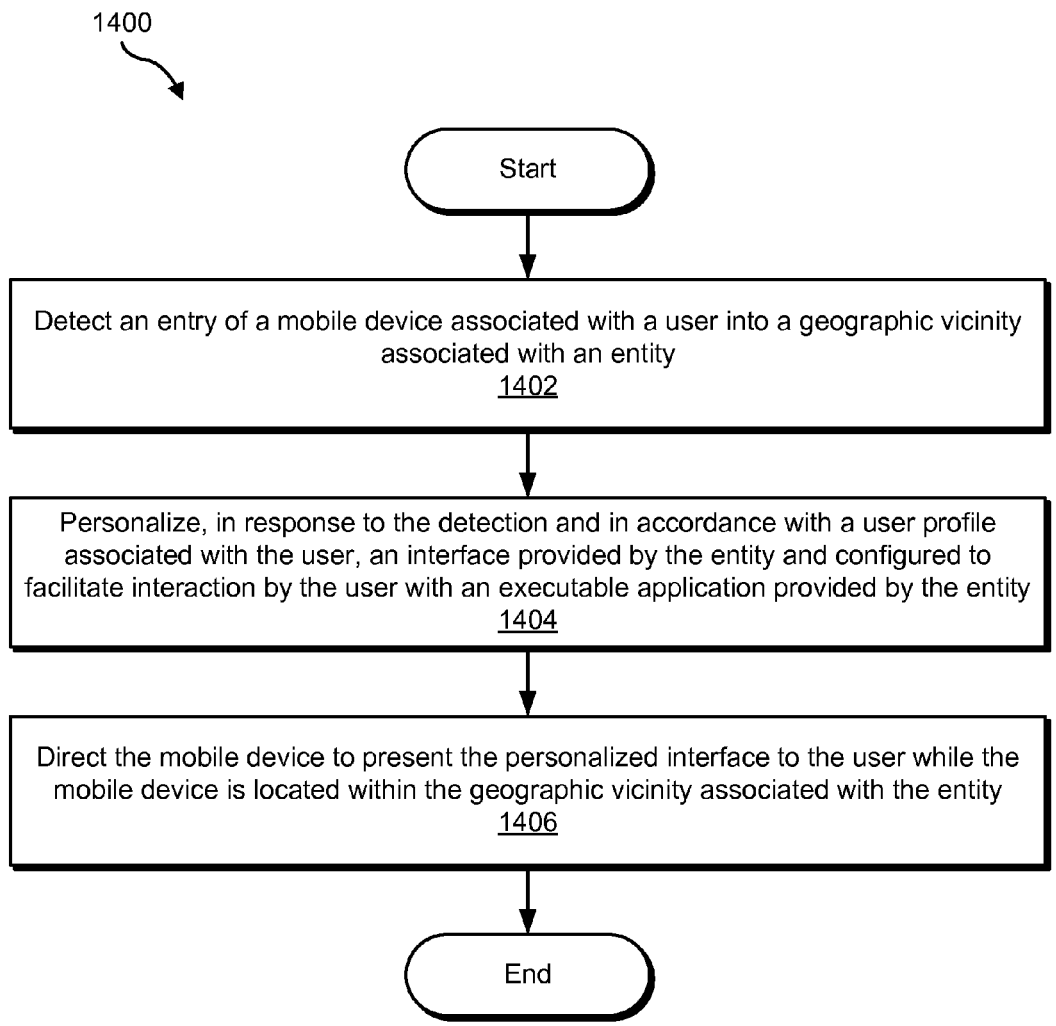

FIG. 14 illustrates another exemplary location-based application management method 1400. While FIG. 14 illustrates exemplary steps according to one embodiment, other embodiments may omit, add to, reorder, and/or modify any of the steps shown in FIG. 14. One or more of the steps shown in FIG. 14 may be performed by location-based application management system 100 and/or any implementation thereof.

In step 1402, a location-based application management system detects an entry of a mobile device associated with a user into a geographic vicinity associated with an entity. Step 1402 may be performed in any of the ways described herein.

In step 1404, the location-based application management system personalizes, in response to the detection and in accordance with a user profile associated with the user, an interface provided by the entity and configured to facilitate interaction by the user with an executable application provided by the entity. Step 1404 may be performed in any of the ways described herein.

In step 1406, the location-based application management system directs the mobile device to present the personalized interface to the user while the mobile device is located within the geographic vicinity associated with the entity. Step 1406 may be performed in any of the ways described herein.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a CD-ROM, DVD, any other optical medium, a RAM, a PROM, an EPROM, a FLASH-EEPROM, any other memory chip or cartridge, or any other tangible medium from which a computer can read.

Figure 15:
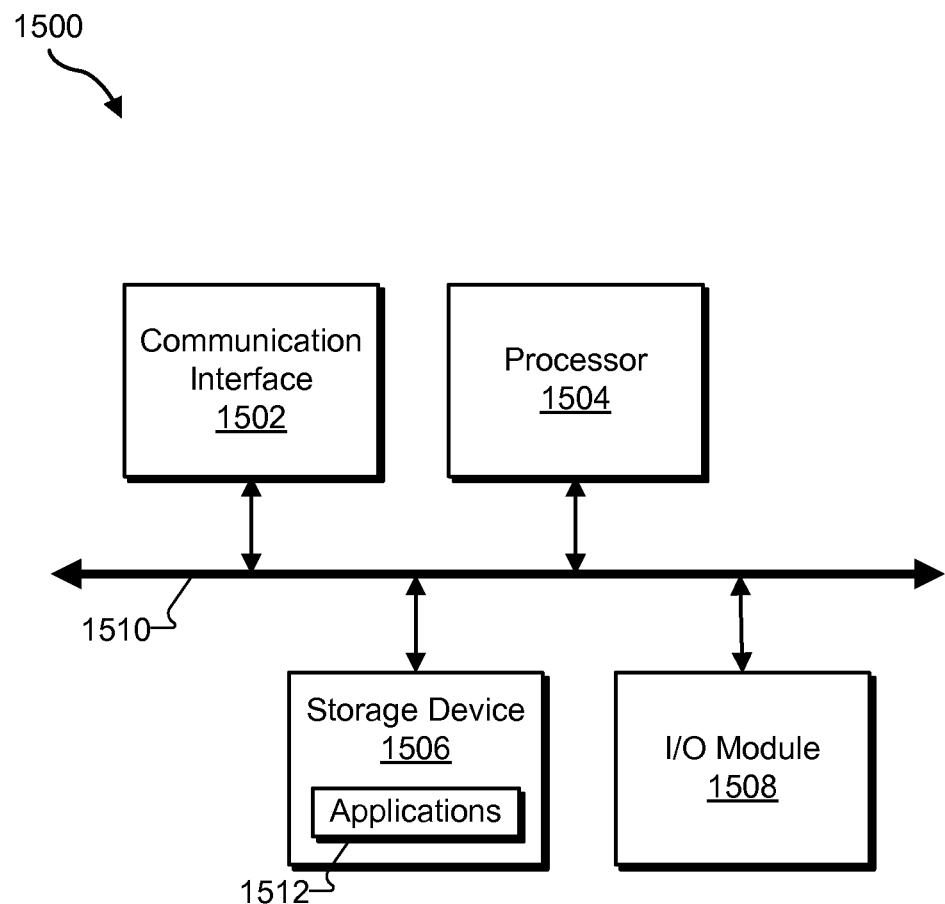
FIG. 15 illustrates an exemplary computing device according to principles described herein.

FIG. 15 illustrates an exemplary computing device 1500 that may be configured to perform one or more of the processes described herein. As shown in FIG. 15, computing device 1500 may include a communication interface 1502, a processor 1504, a storage device 1506, and an input/output ("I/O") module 1508 communicatively connected via a communication infrastructure 1510. While an exemplary computing device 1500 is shown in FIG. 15, the components illustrated in FIG. 15 are not intended to be limiting. Additional or alternative components may be used in other embodiments. Components of computing device 1500 shown in FIG. 15 will now be described in additional detail.

Communication interface 1502 may be configured to communicate with one or more computing devices. Examples of communication interface 1502 include, without limitation, a wired network interface (such as a network interface card), a wireless network interface (such as a wireless network interface card), a modem, an audio/video connection, and any other suitable interface.

Processor 1504 generally represents any type or form of processing unit capable of processing data or interpreting, executing, and/or directing execution of one or more of the instructions, processes, and/or operations described herein. Processor 1504 may direct execution of operations in accordance with one or more applications 1512 or other computer-executable instructions such as may be stored in storage device 1506 or another computer-readable medium.

Storage device 1506 may include one or more data storage media, devices, or configurations and may employ any type, form, and combination of data storage media and/or device. For example, storage device 1506 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1506. For example, data representative of one or more executable applications 1512 configured to direct processor 1504 to perform any of the operations described herein may be stored within storage device 1506. In some examples, data may be arranged in one or more databases residing within storage device 1506.

I/O module 1508 may be configured to receive user input and provide user output and may include any hardware, firmware, software, or combination thereof supportive of input and output capabilities. For example, I/O module 1508 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1508 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1508 is configured to provide graphical data to a display for presentation to a user. The graphical data may be representative of one or more graphical user interfaces and/or any other graphical content as may serve a particular implementation.

In some examples, any of the systems, subsystems, and/or facilities described herein may be implemented by or within one or more components of computing device 1500. For example, one or more applications 1512 residing within storage device 1506 may be configured to direct processor 1504 to perform one or more processes or functions associated with location tracking facility 102 and/or application management facility 104. Likewise, storage facility 106 may be implemented by or within storage device 1506.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    determining, by a location-based application management system, that a mobile device associated with a user is located within a geographic vicinity of both a first physical structure of a first entity and a second physical structure of a second entity;
    automatically identifying, by the location-based application management system in response to the determining, a collaborative executable application associated with both the first entity and the second entity and that aggregates application programming interfaces from both the first entity and the second entity, the collaborative executable application including a stand-alone executable application to be executed by the mobile device, the automatically identifying comprising
        detecting a first identifier associated with the first entity and a second identifier associated with the second entity by analyzing data that defines the geographic vicinity of the first and second physical structures; and
        using the first identifier and the second identifier to identify the collaborative executable application; and
    facilitating, by the location-based application management system, execution by the mobile device of the collaborative executable application while the mobile device is located within the geographic vicinity of both the first and second physical structures.

2. The method of claim 1, wherein the facilitating comprises:
    determining that the identified collaborative executable application already resides on the mobile device when the identifying is performed; and
    directing, in response to the determining that the identified collaborative executable application already resides on the mobile device, the mobile device to begin executing the identified collaborative executable application.

3. The method of claim 1, wherein the facilitating comprises directing the mobile device to present a selectable option to download and install the identified collaborative executable application.

4. The method of claim 3, wherein the facilitating further comprises:
    detecting a selection by the user of the option to download and install the identified collaborative executable application; and
    directing, in response to the selection of the option, the mobile device to download, install, and begin executing the identified collaborative executable application upon completion of the download and installation.

5. The method of claim 1, wherein the facilitating comprises directing the mobile device to present a selectable option to begin executing the identified collaborative executable application.

6. The method of claim 5, wherein the facilitating further comprises:
    detecting a selection by the user of the option to begin executing the identified collaborative executable application; and
    directing, in response to the selection of the option, the mobile device to begin executing the identified collaborative executable application.

7. The method of claim 1, wherein the facilitating comprises directing the mobile device to present a selectable option to purchase access to the identified collaborative executable application.

8. The method of claim 1, wherein the facilitating further comprises directing the mobile device to present an interface personalized to the user in accordance with a user profile associated with the user, wherein the interface is configured to facilitate interaction by the user with the identified collaborative executable application.

9. The method of claim 1, wherein the facilitating comprises:
    authenticating at least one of the mobile device and the user; and
    providing a level of access by the user to the identified collaborative executable application based on the authentication.

10. The method of claim 1, further comprising:
    determining, by the location-based application management system, that the mobile device is no longer located within the geographic vicinity of the first and second physical structures; and
    preventing, by the location-based application management system in response to the determining that the mobile device is no longer located within the geographic vicinity of the first and second physical structures, the identified collaborative executable application from being executed by the mobile device.

11. The method of claim 1, further comprising facilitating, by the location-based application management system while the mobile device is located within the geographic vicinity of the first and second physical structures, completion of one or more transactions between the user and at least one of the first entity and the second entity by way of the identified collaborative executable application.

12. The method of claim 1, wherein the analyzing of the data includes accessing a look-up table that links various entities with their corresponding applications.

13. The method of claim 1, wherein the first and second physical structures are buildings and the first and second entities are businesses associated with the identified collaborative executable application.

14. The method of claim 1, wherein the determining that the mobile device associated with the user is located within the geographic vicinity of the first and second physical structures comprises:
   detecting a geographic location of the mobile device associated with the user; and
   determining that the detected geographic location is within the geographic vicinity of the first and second physical structures.

15. The method of claim 1, wherein the determining that the mobile device associated with the user is located within the geographic vicinity of the first and second physical structures comprises detecting that the mobile device associated with the user enters the geographic vicinity of the first and second physical structures.

16. The method of claim 1, embodied as computer-executable instructions on at least one non-transitory computer-readable medium.

17. A method comprising:
   detecting, by a location-based application management system, an entry of a mobile device associated with a user into a geographic vicinity of both a first physical structure of a first entity and a second physical structure of a second entity;
   automatically identifying, by the location-based application management system in response to the detecting, a collaborative executable application associated with both the first entity and the second entity and that aggregates application programming interfaces from both the first entity and the second entity, the collaborative executable application including a stand-alone executable application to be executed by the mobile device, the automatically identifying comprising
      detecting a first identifier associated with the first entity and a second identifier associated with a second entity by analyzing data that defines the geographic vicinity of the first and second physical structures; and
      using the first identifier and the second identifier to identify the collaborative executable application; and
   personalizing, by the location-based application management system in response to the automatically identifying and in accordance with a user profile associated with the user, an interface configured to facilitate interaction by the user with the collaborative executable application; and
   directing, by the location-based application management system, the mobile device to present the personalized interface to the user while the mobile device is located within the geographic vicinity of the first and second physical structures.

18. The method of claim 17, further comprising facilitating, by the location-based application management system, execution by the mobile device of the collaborative executable application while the mobile device is located within the geographic vicinity of the first and second physical structures.

19. The method of claim 17, embodied as computer-executable instructions on at least one non-transitory computer-readable medium.

20. A system comprising:
   a location tracking facility that determines that a mobile device associated with a user is located within a geographic vicinity of both a first physical structure of a first entity and a second physical structure of a second entity; and
   an application management facility communicatively coupled to the location tracking facility and that
      automatically identifies, in response to the determination that the mobile device is located within the geographic vicinity of the first and second physical structures, a collaborative executable application associated with both the first entity and the second entity and that aggregates application programming interfaces from both the first entity and the second entity, the collaborative executable application including a stand-alone executable application to be executed by the mobile device, wherein the application management facility automatically identifies the collaborative executable application by
      detecting a first identifier associated with the first entity and a second identifier associated with the second entity by analyzing data that defines the geographic vicinity of the first and second physical structures, and
      using the first identifier and the second identifier to identify the collaborative executable application, and
   facilitates execution by the mobile device of the identified collaborative executable application while the mobile device is located within the geographic vicinity of the first and second physical structures.

* * * * *